Oct. 11, 1960    H. A. BLOCK    2,955,613
RELIEF AND REPLENISHING VALVE
Filed Sept. 4, 1959    2 Sheets-Sheet 1
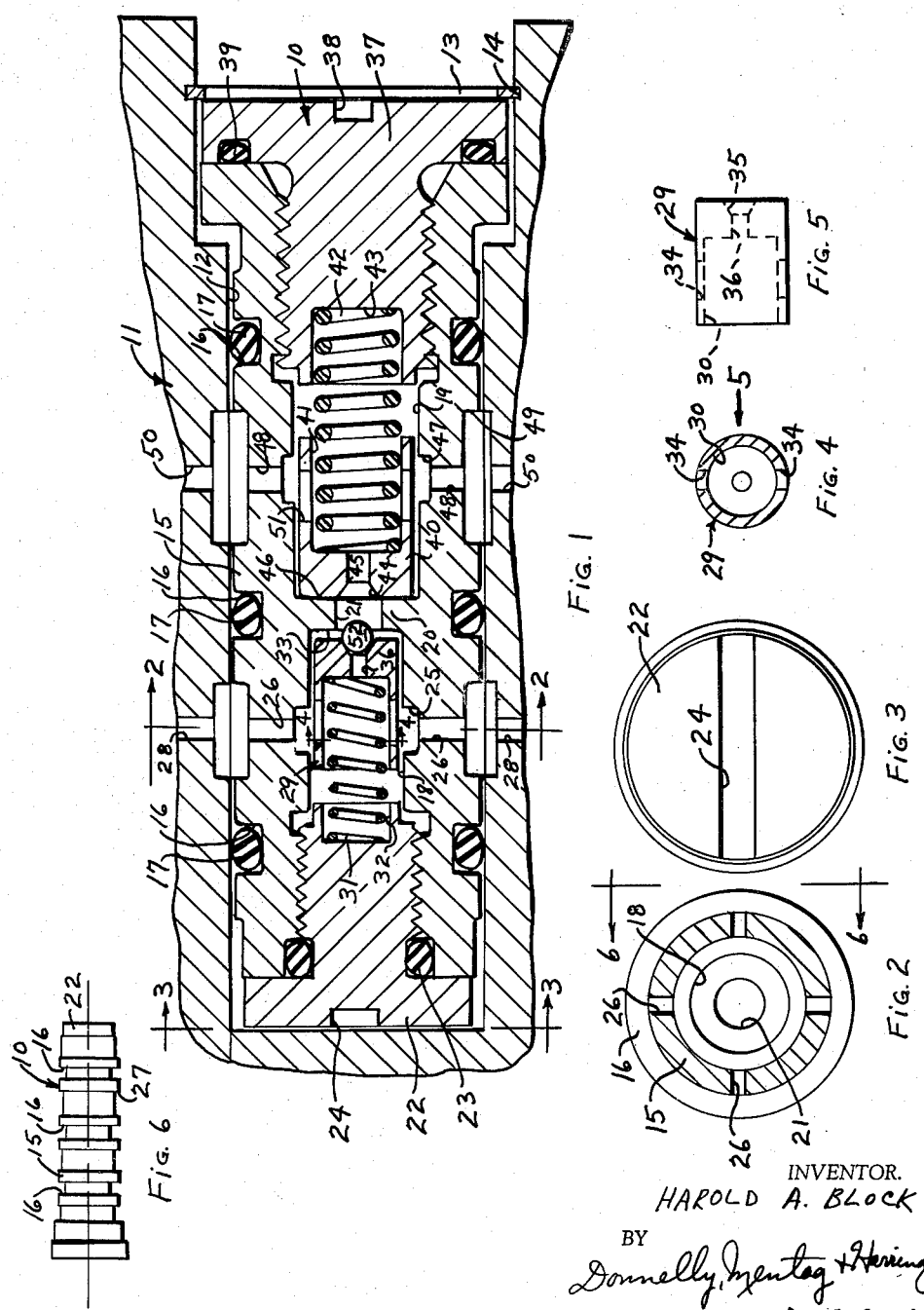
INVENTOR.
HAROLD A. BLOCK
BY
Donnelly, Mentag & Harrington
ATTORNEYS Oct. 11, 1960
H. A. BLOCK
2,955,613
RELIEF AND REPLENISHING VALVE
Filed Sept. 4, 1959
2 Sheets-Sheet 2
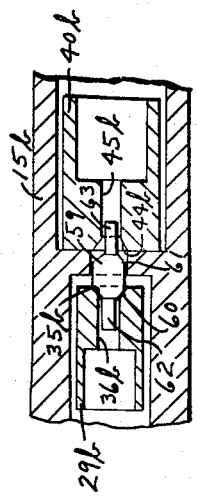
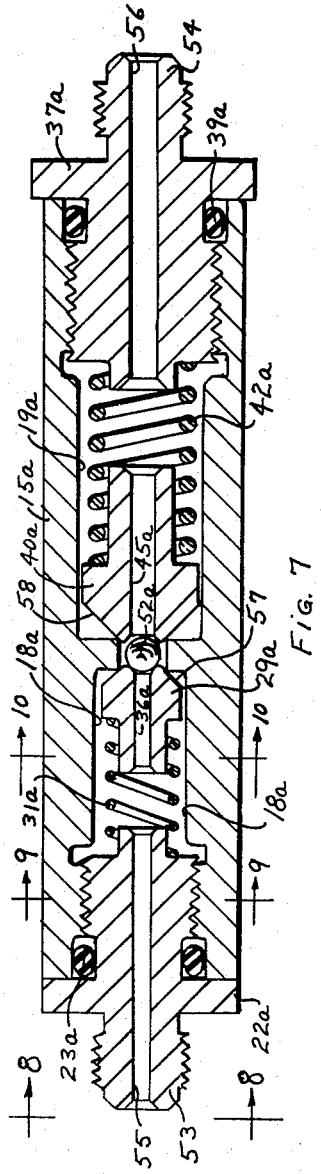
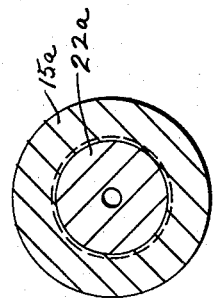
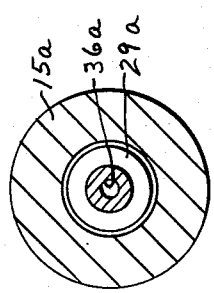
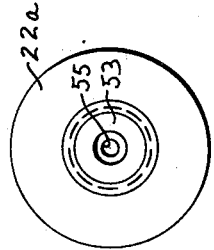
INVENTOR.
HAROLD A. BLOCK
BY
Donnelly, Mentag & Harrington
ATTORNEYS

United States Patent Office 2,955,613
Patented Oct. 11, 1960

2,955,613

RELIEF AND REPLENISHING VALVE

Harold A. Block, Ferndale, Mich., assignor to Bachan Manufacturing Company, Hazel Park, Mich., a corporation of Michigan Filed Sept. 4, 1959, Ser. No. 838,277

8 Claims. (Cl. 137—493.9)

This invention relates generally to improvements in the valve art, and more particularly, to a novel and improved relief and replenishing valve.

It is an important object of this invention to provide a valve which is capable of permitting a regulated flow of hydraulic or pneumatic fluid to a component, at a preset minimum pressure while maintaining the desired or required system or component "back" pressure.

It is still another object of this invention to provide a valve of the class described which is primarily a cartridge type unit which can cover a maximum range of predetermined pressure and flow valves but which may be "line" installed by utilizing end fittings to permit end porting instead of side porting.

It is a further object of this invention to provide a valve of the class described which is capable of operating as a two-way check valve in a hydraulic or pneumatic system for pressure and flow control, whereby, weight saving may be accomplished and costs reduced due to a minimization of plumbing and porting.

It is a still further object of the present invention to provide a relief and replenishing valve which is compact and simple in construction, economical of manufacture, and efficient in operation.

It is still another object of this invention to provide a valve of the class described which will include a single housing in which two separate valves are contained and which further includes a dual seat permitting containment of pressure or flow from either direction as required. A movable single ball will seat in either of the two valves as pressure dictates and prevent flow until pressure "build-up" required relief, as predetermined by the valve spring seating one of the valves, against which the ball is seated. At this point said one of the valves will unseat and pressure will be relieved through an annular orifice created by the valve unseating. A tubular orifice in the other valve meanwhile restricts the amount of flow as predetermined by individual system or component design considerations. Flow in the opposite direction will be dictated by identical design considerations.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a central longitudinal sectional view of a relief and replenishing valve made in accordance with the principles of the invention and showing the valve mounted in a fluid system;

Fig. 2 is a reduced elevational sectional view of the valve structure illustrated in Fig. 1, with parts removed;

Fig. 3 is a left end elevational view of the valve structure illustrated in Fig. 1, taken along the line 3—3 thereof, and looking in the direction of the arrows;

Fig. 4 is a fragmentary elevational sectional view of the valve structure illustrated in Fig. 1, taken along the line 4—4 thereof, looking in the direction of the arrows, and with parts removed;

Fig. 5 is a side elevational view of the structure illustrated in Fig. 4, taken in the direction of the arrow marked 5;

Fig. 6 is a reduced side elevational view of the valve structure illustrated in Fig. 2, taken along the line 6—6 thereof, and looking in the direction of the arrows;

Fig. 7 is a central longitudinal sectional view of a second embodiment of the invention;

Fig. 8 is an end elevational view of the structure illustrated in Fig. 7, taken along the line 8—8 thereof, and looking in the direction of the arrows;

Fig. 9 is an elevational sectional view of the structure illustrated in Fig. 7, taken along the line 9—9 thereof, and looking in the direction of the arrows;

Fig. 10 is an elevational sectional view of the structure illustrated in Fig. 7, taken along the line 10—10 thereof, and looking in the direction of the arrows; and, Fig. 11 is a fragmentary, central, sectional view of a third embodiment of the invention.

Referring now to the drawings and in particular to Figs. 1 through 6, a first embodiment of the invention is shown and is indicated by the numeral 10. The valve 10 is illustrated as a cartridge type valve assembly which is adapted to be quickly and easily detachably mounted in a pump or a fluid system. As shown, the valve 10 is mounted in the bore 12 which is formed in a system generally indicated by the numeral 11 and shown fragmentarily. The valve 10 may be held in place in such a system by any suitable means, as by a clip ring 13 mounted in a groove as 14.

The cartridge type valve 10 comprises a valve body or housing 15 which is provided with a plurality of annular peripheral grooves as 16 for the seating therein of suitable O ring sealing means 17. As shown in Fig. 1, the valve includes a pair of longitudinally disposed coaxial valve chambers indicated by the numerals 18 and 19 and which are separated at the inner ends thereof by the dividing wall 20. The chamber 18 is smaller in cross-section than the chamber 19 so as to be fitted by different diameter valve parts whereby a fool-proof valve assembly is provided. With such a construction, it is not possible to interchange the valves by accident or mistake. The valve chambers 18 and 19 are interconnected by means of the passageway 21.

As shown in Fig. 1, the outer end of the small valve chamber 18 is enclosed by the plug 22 which is threadably mounted in place in the valve body 15 and is provided with a suitable O ring sealing means 23 therebetween. The plug 22 is provided with a screw-driver slot 24 in the outer face thereof. The valve chamber 18 is provided with an annular groove 25 disposed substantially centrally of the valve chamber and this groove communicates through a plurality of ports 26 with the outlet annular peripheral groove 27. It will be seen that with such a side porting construction that the outlet groove 27 may mate with a number of fluid passage ways as 28 in the system component 11.

Movably mounted in the valve chamber 18 is a valve member generally indicated by the numeral 29. The valve member 29 is provided on the rear end thereof with a recess or inwardly extended bore 30, as shown in Figs. 1 and 5. A calibrated coil spring 31 is mounted in the chamber 18 and the inner end of this spring is seated in the bore 30. The other end of the spring 31 is seated in a recess 32 which is formed in the inner end of the plug 22. The spring 31 is adapted to normally bias the valve 29 forwardly against the seat 33 formed by the one side of the dividing wall 20. The valve 29 is provided with a plurality of ports 34 which communicate the recess 30 with the valve chamber 18. The valve 29 is further provided with a tapered valve seat 35 which communicates by means of the orifice 36 with the valve recess 30, and which is adapted to seat the ball check valve member 52 depending on the direction of flow of fluid through the valve.

The right end of the valve 10 as viewed in Fig. 1 is constructed in the same manner as the aforedescribed left end of the valve, but this right end is constructed with larger sized parts. The large valve chamber 19 is enclosed at the outer end thereof by the threadably mounted plug 37 which is provided with a screw-driver slot 38 and suitable O-ring sealing means 39. A second valve member 40 is movably mounted in the chamber 19 and is provided with the recess 41 on the rear end thereof which is adapted to receive the inner end of the calibrated coil spring 42. The outer end of the coil spring 42 is seated in the recess 43 which is formed on the inner end of the plug 37. The valve 40 is provided with a tapered valve seat 44 on the front end thereof for seating the ball 52. The valve seat 44 communicates with the recess 41 by means of the orifice or passageway 45. The spring 42 functions to normally bias the valve 40 inwardly against the flat seat formed by the adjacent face 46 of the dividing wall 20.

The valve chamber 19 is provided with the annular groove 47 which communicates by means of a plurality of ports 48 with the annular peripheral groove 49 which in turn is adapted to be connected to a suitable source of fluid pressure by means of the passage ways 50. The valve 40 is provided with the ports 51 which communicate the recess 41 with the valve chamber 19.

In use, assuming that the highest pressure is entering the valve 10 through the passages 50 and ports 48, and into the large valve chamber 19, the valve structure will assume the position of the structure shown in Fig. 1, that is, the combination of the fluid under pressure and the pressure of spring 42 will move the valve 40 against the dividing wall 20. The ball check valve means 52 will move into the valve seat 35 so as to prevent flow of fluid through the passage way 36. The pressure will then build up on the inner face of the valve 29 and it will be moved backwardly or to the left as viewed in Fig. 1 against the pressure of spring 31. The fluid will then flow around the valve 29 and out the groove 25 and ports 26, and passages 28. If the back pressure in the system builds up to a point where it is greater than that in the passages 50, the valve 29 will be moved to the right as viewed in Fig. 1, and the ball will seat in the valve seat 44 in the other valve 40. The valve 40 will thus prevent further flow therethrough unless the back pressure is greater than the combined pressure coming in through the passages 50 and the pressure of spring 42 wherby the valve 40 would be moved to the right as viewed in Fig. 1 and be unseated from the seat 46 to permit flow in the reverse direction. It will be understood that the ball 52 seats on either the seat 35 or 44 depending upon the direction of the highest pressure. It will also be understood that an equivalent structure may be used instead of the check ball 52, as for example, some other configuration such as a guide taper pin closing on a sharp valve orifice may be used. The taper pin may be guided through the valve orifice 36 and 45, thus permitting controlled flow through an annular orifice.

The second embodiment of the invention is disclosed in Figs. 7 through 10 and this embodiment illustrates the application of the valve of the present invention to an "in line" construction. The only difference between the first embodiment of Figs. 7 through 10 is that the end plugs 22a and 37a are provided with end fittings 53 and 54, respectively, and these plugs are further provided with the fluid passages 55 and 56 therethrough which communicate with the chambers 18a and 19a respectively. Accordingly, the parts of the second embodiment which are similar to the first embodiment have been marked with corresponding reference numerals followed by the small letter "a." A further difference in this second embodiment over the first embodiment is that the valve members 29a and 40a are provided with conical valve faces as indicated by the numerals 57 and 58, respectively. The valve members 29 and 40 of the first embodiment were provided with flat vertical valve faces. A further difference in the second embodiment is that the calibrated valve springs 31a and 42a are mounted around the hubs formed on their respective valve members and plugs. The embodiment of Figs. 7 through 10 functions in the same manner as the first described embodiment with the exception that the port for the valve is at the ends of the valve instead of at the sides of the valve.

A third embodiment of the invention is shown in Fig. 11. Fig. 11 shows a fragmentary part of a valve made in accordance with the invention and which is provided with a guide taper pin 52b instead of the ball check valve means 52. The structure of this third embodiment is marked with reference numerals which correspond to the similar reference numerals of the first embodiment followed by the small letter "b" to designate the similar structure. The tapered check pin 52b is provided with the annular body portion 59 which has the tapered shoulders 60 and 61 for engagement with the valve seats 35b and 44b, respectively. The tapered check pin 52b is further provided with the integral axially extended guides 62 and 63 which are circular in cross-section and extend outwardly from the ends of the pin and which are adapted to be slidably mounted in the orifices 36b and 45b, respectively, with an annular clearance therebetween. This third embodiment functions in the same manner as the first two described embodiments.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A valve comprising: a body having a pair of valve chambers separated by a dividing wall which is provided with an opening therethrough to communicate said chambers; said wall having a valve seat on each side thereof; each of said chambers being provided with port means for admitting and exhausting fluid under pressure; a valve movably mounted in each of said chambers; a biasing means in each of said chambers for normally biasing said valves against said seats on said dividing wall; each of said valves being provided with an orifice therethrough for communicating said opening through said wall with the chamber in which each of the respective valves is disposed when the valve is seated on said wall; and, a movable check valve means in said opening in said wall for selective closing of said orifices in accordance with the direction of fluid flow through said valve and the pressures exerted thereon.

2. A valve as defined in claim 1, wherein: said movable check valve means comprises a ball valve.

3. A valve as defined in claim 1, wherein: said movable check valve means comprises a tapered check pin.

4. A valve as defined in claim 1, wherein: each of said valves is provided with a flat seat on the face thereof for engagement with the seats on said wall.

5. A valve as defined in claim 1, wherein: each of said valves is provided with a conical seat on the front end thereof for engagement with its respective seat on said wall.

6. A valve as defined in claim 1, wherein: said port means in said body are formed in the ends of the valve to permit in line use of the valve.

7. A valve as defined in claim 1, wherein: said port means are formed in the sides of the valve to permit cartridge type use of the valve.

8. A valve comprising: a body having a pair of valve chambers separated by a dividing wall which is provided with an opening therethrough to communicate said chambers; said wall having a valve seat on each side thereof; each of said chambers being provided with port means for admitting and exhausting fluid under pressure; a valve movably mounted in each of said chambers; a biasing means in each of said chambers for normally biasing said valves against said seats on said dividing wall; each of said valves being provided with an orifice therethrough for communicating said opening through said wall with the chamber in which each of the respective valves is disposed when the valve is seated on said wall; a movable check valve means in said opening in said wall for selective closing of said orifices in accordance with the direction of fluid flow through said valve and the pressures exerted thereon; said chambers being disposed in axial alignment with each other with one of said chambers being larger than the other; and, one of said valves being larger than the other for mounting in the larger of said chambers.

References Cited in the file of this patent

UNITED STATES PATENTS

| | | |
|---|---|---|
| 2,725,074 | McLeod | Nov. 29, 1955 |
| 2,886,059 | Castonguay et al. | May 12, 1959 |